US011905408B2

(12) United States Patent
Kang et al.

(10) Patent No.: US 11,905,408 B2
(45) Date of Patent: Feb. 20, 2024

(54) RESIN COMPOSITION AND MOLDED PRODUCT MANUFACTURED THEREFROM

(71) Applicant: LOTTE CHEMICAL CORPORATION, Seoul (KR)

(72) Inventors: Taegon Kang, Uiwang-si (KR); Suyeon Lee, Uiwang-si (KR); Daheen Jeong, Uiwang-si (KR); Kihong Choi, Uiwang-si (KR); Seungshik Shin, Uiwang-si (KR); Dongin Ha, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 699 days.

(21) Appl. No.: 16/761,538

(22) PCT Filed: Nov. 28, 2018

(86) PCT No.: PCT/KR2018/014832
§ 371 (c)(1),
(2) Date: May 5, 2020

(87) PCT Pub. No.: WO2019/107919
PCT Pub. Date: Jun. 6, 2019

(65) Prior Publication Data
US 2020/0263030 A1 Aug. 20, 2020

(30) Foreign Application Priority Data

Nov. 30, 2017 (KR) .................. 10-2017-0163305
Sep. 5, 2018 (KR) .................. 10-2018-0106136

(51) Int. Cl.
*C08L 33/10* (2006.01)
*C08L 69/00* (2006.01)
*C08L 55/02* (2006.01)
*C08K 5/521* (2006.01)
*C08K 3/26* (2006.01)
*B29K 509/00* (2006.01)
*B29C 45/00* (2006.01)
*B29K 69/00* (2006.01)
*B29K 255/02* (2006.01)
*B29K 33/00* (2006.01)
*C08K 3/34* (2006.01)

(52) U.S. Cl.
CPC .............. *C08L 69/00* (2013.01); *C08L 33/10* (2013.01); *C08L 55/02* (2013.01); *B29C 45/0001* (2013.01); *B29K 2033/12* (2013.01); *B29K 2069/00* (2013.01); *B29K 2255/02* (2013.01); *B29K 2509/00* (2013.01); *C08K 3/34* (2013.01); *C08K 5/521* (2013.01); *C08K 2003/265* (2013.01)

(58) Field of Classification Search
CPC .......... C08L 33/10; C08L 69/00; C08L 55/02; C08K 3/34; C08K 5/521; C08K 2003/265

USPC ........................................................ 525/67
See application file for complete search history.

(56) References Cited

U.S. PATENT DOCUMENTS

| 5,994,467 | A | 11/1999 | Farah et al. |
| 8,946,332 | B2 | 2/2015 | van Gisbergen et al. |
| 2004/0030021 | A1 | 2/2004 | Mitsunaga et al. |
| 2005/0182166 | A1 | 8/2005 | Kurasawa |
| 2005/0256275 | A1 | 11/2005 | Kobayashi et al. |
| 2008/0226857 | A1 | 9/2008 | Kobayashi et al. |
| 2008/0262151 | A1 | 10/2008 | Ishii et al. |
| 2011/0028615 | A1 | 2/2011 | Li et al. |
| 2014/0357769 | A1 | 12/2014 | Zheng et al. |
| 2015/0183986 | A1 | 7/2015 | Kim et al. |
| 2015/0247038 | A1 | 9/2015 | Kim et al. |
| 2017/0342262 | A1 | 11/2017 | Choi et al. |

FOREIGN PATENT DOCUMENTS

| CN | 105504698 A | 4/2016 | |
| CN | 107109044 A | 8/2017 | |
| EP | 992542 A1 * | 4/2000 | ............. C08L 69/00 |
| EP | 0992542 A1 | 4/2000 | |
| JP | 2003-012903 A | 1/2003 | |
| JP | 2005-206802 A | 8/2005 | |
| JP | 2006-342199 A | 12/2006 | |
| JP | 2007-056247 A | 3/2007 | |
| JP | 2007-211113 A | 8/2007 | |
| JP | 2007-308529 A | 11/2007 | |
| JP | 2008-255214 A | 10/2008 | |
| JP | 2011-207967 A | 10/2011 | |
| JP | 2013-501103 A | 1/2013 | |
| JP | 2013-163768 A | 8/2013 | |
| JP | 2013163768 A * | 8/2013 | |
| KR | 10-0245948 B1 | 3/1996 | |

(Continued)

OTHER PUBLICATIONS

Office Action in counterpart Chinese Application No. 201880074768.X dated Jan. 6, 2022, and accompanying Search Report dated Dec. 30, 2021, pp. 1-8.
English-translation of Office Action in counterpart Chinese Application No. 201880074768.X dated Jan. 6, 2022, pp. 1-10.
Decision to Grant a Patent in counterpart Japanese Application No. 2020-526038 dated Jan. 11, 2022, pp. 1-4.
English-translation of Decision to Grant a Patent in counterpart Japanese Application No. 2020-526038 dated Jan. 11, 2022, pp. 1-2.
Wang Wenguang, "Application of Plastic Materials", Chemical Industry Press, Jan. 31, 2001, p. 316.
English-translation of "Wang Wenguang, Application of Plastic Materials, Chemical Industry Press", Jan. 31, 2001, p. 316.

(Continued)

*Primary Examiner* — Kelechi C Egwim
(74) *Attorney, Agent, or Firm* — Additon, Pendleton & Witherspoon, P.A.

(57) ABSTRACT

The present invention relates to a resin composition including (A) a polycarbonate resin; (B) an inorganic filler including at least one of calcium carbonate, talc, and wollastonite; (C) a polyolefin-based resin including a glycidyl group; and (D) a phosphorus-based flame retardant, and a molded article manufactured using the same.

5 Claims, No Drawings

(56) References Cited

FOREIGN PATENT DOCUMENTS

| | | | |
|---|---|---|---|
| KR | 100245948 B1 * | 3/2000 | |
| KR | 10-0849867 B1 | 4/2004 | |
| KR | 10-2005-0109049 A | 11/2005 | |
| KR | 10-2012-0089436 A | 8/2012 | |
| KR | 10-1505742 B1 | 10/2013 | |
| KR | 10-1714824 B1 | 7/2015 | |
| KR | 10-2015-0102858 A | 9/2015 | |
| KR | 10-2016-0016963 A | 2/2016 | |
| KR | 10-2016-0060906 A | 5/2016 | |
| KR | 10-1670550 B1 | 5/2016 | |
| WO | 2013-111846 A1 | 8/2013 | |
| WO | WO-2013111846 A1 * | 8/2013 | ............... C08K 5/49 |
| WO | WO-2016108539 A1 * | 7/2016 | ............. C08K 3/013 |
| WO | 2019/107919 A1 | 6/2019 | |

OTHER PUBLICATIONS

Luo Hesheng, "Plastic Modification and Practical Technology", Guangdong science and Technology Press, Apr. 30, 2007, p. 132.
English-translation of "Luo Hesheng, Plastic Modification and Practical Technology, Guangdong science and Technology Press", Apr. 30, 2007, p. 132.
Office Action in counterpart Japanese Application No. 2020-526038 dated May 12, 2021, pp. 1-5.
Extended Search Report in counterpart European Application No. 18883434.5 dated Jun. 29, 2021, pp. 1-6.
International Search Report in counterpart International Application No. PCT/KR2018/014832 dated Mar. 4, 2019, pp. 1-4.

* cited by examiner

RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2018/014832, filed Nov. 28, 2018, which published as WO 2019/107919 on Jun. 6, 2019; Korean Patent Application No. 10-2017-0163305, filed in the Korean Intellectual Property Office on Nov. 30, 2017; and Korean Patent Application No. 10-2018-0106136, filed in the Korean Intellectual Property Office on Sep. 5, 2018, the entire disclosure of each of which is incorporated herein by reference.

TECHNICAL FIELD

The present invention relates to a resin composition and a molded article manufactured using the same.

BACKGROUND ART

In general, polycarbonate (PC) resin belongs to engineering plastic and has improved impact strength, heat resistance, dimensional stability, weather resistance, chemical resistance, and electrical characteristics, and transparency. In addition, the polycarbonate may cost down and reinforce a modulus by injecting various inorganic fillers.

However, the inorganic fillers may bring about an appearance difference depending on their kinds and shapes and increase dimensional stability such as hardness and the like, but thermal decomposition of the PC resin may occur.

An additive such as a heat stabilizer and an antioxidant may be used for ensuring thermal stability of a PC material, but when it is used in excessive amount, a melting point becomes lower enough to generate blocking caused by intermolecular coalesce, and an inorganic filler including a hydroxyl group may be also used for decreasing a basicity, but it is difficult to provide thermal stability with a desirable level.

DISCLOSURE

Technical Problem

An embodiment provides a resin composition having improved thermal stability and impact resistance.

Another embodiment provides a molded article manufactured using the resin composition.

Technical Solution

In an embodiment, a resin composition includes (A) a polycarbonate resin, (B) an inorganic filler including at least one of calcium carbonate, talc, and wollastonite, (C) a polyolefin-based resin including a glycidyl group, and (D) a phosphorus-based flame retardant.

An amount of the inorganic filler may be 3 to 30 wt % based on a total weight of the resin composition.

Among the inorganic fillers, calcium carbonate and talc or wollastonite may be included in a weight ratio of 1:9 to 9:1.

The polyolefin-based resin including the glycidyl group may include a polyethylene backbone having an epoxy group.

The polyolefin-based resin including the glycidyl group may be a copolymer of an ethylene glycidyl methacrylate copolymer with a styrene-based polymer or an acrylonitrile-styrene copolymer.

The polyolefin-based resin including the glycidyl group may be included in an amount of 0.1 to 10 parts by weight based on 100 parts by weight of the resin composition.

The phosphorus-based flame retardant may be bisphenol-A bis(diphenylphosphate).

The phosphorus-based flame retardant may be included in an amount of 5 to 25 parts by weight based on 100 parts by weight of the resin composition. Another embodiment provides a molded article manufactured using the aforementioned resin composition.

Advantageous Effects

According to an embodiment, it is possible to provide a resin composition having improved thermal stability and impact resistance by preventing thermal decomposition of the polycarbonate resin.

BEST MODE

Hereinafter, embodiments of the present invention are described in detail. However, these embodiments are exemplary, the present invention is not limited thereto and the present invention is defined by the scope of claims.

Hereinafter, the resin composition according to the embodiment is described in more detail.

The resin composition according to an embodiment of the present invention includes (A) a polycarbonate resin, (B) an inorganic filler including at least one of calcium carbonate, talc, and wollastonite, (C) a polyolefin-based resin including a glycidyl group, and (D) a phosphorus-based flame retardant.

In a conventional thermoplastic polycarbonate resin composition, an antioxidant or a thermal stabilizer has been applied to improve thermal stability during injection molding, but even if the additives are used in excess, a degree of thermal stability improvement is limited, and physical properties of the polycarbonate resin may be deteriorated.

However, the resin composition according to an embodiment may not only reinforce physical properties such as impact resistance by including an inorganic filler including at least one of calcium carbonate, talc, and wollastonite, but also prevent thermal decomposition of the polycarbonate resin at high temperatures by applying the polyolefin-based resin including the glycidyl group. together with the inorganic filler thereto. As a result, the resin composition of the present invention may have improved thermal stability at high temperatures without deteriorating physical properties.

Hereinafter, each component of the resin composition is described in more detail.

(A) Polycarbonate Resin

The polycarbonate resin according to an embodiment may be prepared by reacting diphenols represented by Chemical Formula 1 with phosgene, halogenic acid ester, carbonate ester, or a combination thereof.

[Chemical Formula 1]

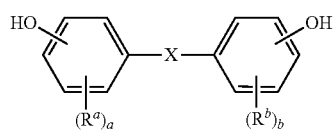

In Chemical Formula 1,

X is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, —CO, S, and $SO_2$, $R^a$ and $R^b$ are independently, a substituted or unsubstituted C1 to C30 alkyl group or a substituted or unsubstituted C6 to C30 aryl group, and a and b are independently integers of 0 to 4.

For example, two or more types of the diphenols represented by Chemical Formula 1 may be combined to constitute a repeating unit of a polycarbonate resin. For example, the diphenols may be 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenols, for example, 2,2-bis(4-hydroxyphenyl)propane, 2,2-bis(3,5-dichloro-4-hydroxyphenyl)propane or 1,1-bis(4-hydroxyphenyl)cyclohexane may be used. For example, in an embodiment, the polycarbonate resin may be 2,2-bis(4-hydroxyphenyl)propane that is bisphenol-A.

For example, the polycarbonate resin may be a linear polycarbonate resin, a branched polycarbonate resin, or a polyester carbonate copolymer resin.

For example, specific examples of the linear polycarbonate resin may be bisphenol-A-based polycarbonate resin. Specific examples of the branched polycarbonate resin may be a polymer prepared by reacting a multi-functional aromatic compound such as trimellitic anhydride, trimellitic acid, and the like with diphenols and a carbonate. The polyester carbonate copolymer resin may be prepared by reacting bifunctional carboxylic acid with diphenols and carbonate, wherein the used carbonate is diaryl carbonate such as diphenyl carbonate or ethylene carbonate.

For example, the weight average molecular weight of the polycarbonate resin may be 10,000 g/mol to 100,000 g/mol, for example, 15,000 g/mol to 50,000 g/mol, but is not limited thereto. The polycarbonate resin according to an embodiment may include at least two types of polycarbonate resins having a different weight average molecular weight (Mw) in order to satisfy desired flowability.

The polycarbonate resin may be included in an amount of 50 to 90 wt %, for example, 60 to 90 wt %, for example, 70 to 90 wt %, for example, 75 to 85 wt %, for example, 75 to 80 wt % based on a total amount of the resin composition. When the polycarbonate resin is included within the amount range, it is possible to provide a resin composition having improved mechanical properties such as stiffness and impact strength.

(B) Inorganic Filler

The resin composition according to an embodiment includes the inorganic filler (B) in order to prevent thermal decomposition of the polycarbonate resin. For example, the inorganic filler may prevent thermal decomposition of polycarbonate by coordination with a polyolefin-based resin including a glycidyl group that will be described later.

For example, the inorganic filler may include at least one of calcium carbonate, talc, and wollastonite.

For example, the inorganic filler may include at least two of calcium carbonate, talc, and wollastonite.

For example, the inorganic filler may include all of calcium carbonate, talc, and wollastonite.

The inorganic filler may be included in an amount of 3 to 30 wt % based on a total weight of the resin composition. For example, the inorganic filler may be included in an amount of 5 to 30 wt %, for example, 10 to 30 wt %, for example, 15 to 30 wt %, for example, 5 to 20 wt %, for example For example, 10 to 20 wt %, for example, 15 to 20 wt %, based on the total weight of the resin composition. When an amount of the inorganic filler is outside the above range, mechanical properties or heat resistance of the resin composition may be deteriorated.

The inorganic filler may include a first inorganic filler selected from the calcium carbonate, the talc and the wollastonite, and a second inorganic filler selected from the calcium carbonate, the talc and the wollastonite and different from the first inorganic filler. Herein, the first inorganic filler and the second inorganic filler may be included in a weight ratio of 1:9 to 9:1.

For example, the first inorganic filler may be calcium carbonate, the second inorganic filler may be talc, and the inorganic filler may include the calcium carbonate and the talc in a weight ratio of 1:9 to 9:1.

For example, the first inorganic filler may be calcium carbonate, the second inorganic filler may be wollastonite, and the inorganic filler may include the calcium carbonate and the wollastonite in a weight ratio of 1:9 to 9:1.

For example, the first inorganic filler may be talc, the second inorganic filler may be wollastonite, and the inorganic filler may include the talc and the wollastonite in a weight ratio of 1:9 to 9:1.

For example, the inorganic filler may include 40 to 60 parts by weight of the calcium carbonate, 20 to 40 parts by weight of the talc, and 20 to 40 parts by weight of the wollastonite based on a total weight of the inorganic filler. For example, it may include 40 to 50 parts by weight of the calcium carbonate, 20 to 30 parts by weight of the talc, and 30 to 40 parts by weight of wollastonite. For example, it may include 40 to 45 parts by weight of the calcium carbonate, 20 to 25 parts by weight of the talc, and 30 to 35 parts by weight of the wollastonite.

(C) Polyolefin-Based Resin Including Glycidyl Group

The resin composition according to an embodiment exhibits improved thermal stability by including the polyolefin-based resin including the glycidyl group. For example, the polyolefin-based resin including the glycidyl group may induce a coordination with the aforementioned inorganic filler, and bound to the terminal —OH group on the surface of the polycarbonate resin, thereby preventing thermal decomposition of the polycarbonate resin.

The polyolefin-based resin including the glycidyl group may be, for example, a homopolymer of an olefin having a glycidyl group, or a copolymer of an olefin and an unsaturated monomer having a glycidyl group, or an olefin polymer copolymerized with an unsaturated monomer having a glycidyl group, and the copolymer may be a graft copolymer, a random copolymer, or a block copolymer.

Examples of the olefins may be ethylene, propylene, 1-butene, isobutylene, 2-butene, cyclobutene, 1-pentene, 1-hexene, 4-methyl-1-pentene, 1-octene, 3-methyl-1-butene, 4-methyl-1-butene, cyclopentene, 1-hexene, cyclohexene, 1-octene, 1-decene, and 1-dodecene which may be used alone or in combination of two or more, but are not limited thereto.

For example, the unsaturated monomer having the glycidyl group may be, for example, glycidyl acrylate, glycidyl methacrylate, vinyl glycidyl ether, allyl glycidyl ether, methacryl glycidyl ether, 2-methyl allyl glycidyl ether, styrene-p-glycidyl ether, and the like, which may be used alone or in combination of two or more.

As an example, the polyolefin-based resin including the glycidyl group may be a resin including a polyethylene backbone having an epoxy group, for example, a polyolefin-based resin in which a styrene-based polymer or an acrylonitrile-styrene copolymer is copolymerized with an ethylene glycidyl methacrylate copolymer. For example, it may be ethylene-glycidyl methacrylate grafted styrene acrylonitrile.

The polyolefin-based resin including the glycidyl group may be included in an amount of 0.1 to 10 parts by weight based on 100 parts by weight of the resin composition. For example, it may be included in an amount of 0.1 to 7 parts by weight, for example, 0.1 to 5 parts by weight, for example, 0.1 to 3 parts by weight. When the polyolefin-based resin including the glycidyl group satisfies the above range, thermal stability may be secured.

(D) Phosphorus-Based Flame Retardant

The resin composition according to an embodiment includes a phosphorus-based flame retardant. The phosphorus-based flame retardant is intended to improve flame retardancy of the resin composition and may be a general phosphorus-based flame retardant used in the flame retardant resin composition. For example, the phosphorus-based flame retardant may be a phosphate compound, a phosphonate compound, a phosphinate compound, a phosphine oxide compound, a phosphazene compound, and a metal salt thereof. The phosphorus-based flame retardant may be used alone or in combination of two or more.

In one example, the phosphorus-based flame retardant may be a phosphoric acid ester compound represented by Chemical Formula 2 or a mixture thereof, but is not limited thereto.

[Chemical Formula 2]

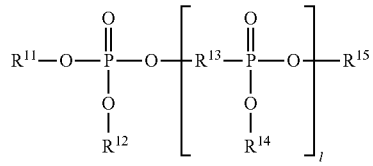

In Chemical Formula 2, $R^{11}$, $R^{12}$, $R^{14}$, and $R^{15}$ are independently hydrogen, a substituted or unsubstituted C6 to C20 aryl group, a substituted or unsubstituted C7 to C30 arylalkyl group, or a combination thereof, $R^{13}$ is a substituted or unsubstituted C6 to C20 arylene group or a substituted or unsubstituted C7 to C30 arylalkyl group, and I is an integer of 0 to 4.

In one example, as an example of the phosphoric acid ester-based compound represented by Chemical Formula 2, when n is 0, diaryl phosphate such as diphenyl phosphate, triphenyl phosphate, tricresyl phosphate, trizarenyl phosphate, and tri(2,6-dimethylphenyl) phosphate, tri(2,4,6-trimethylphenyl) phosphate, tri(2,4-diterriarybutylphenyl) phosphate, tri(2,6-dimethylphenyl) phosphate, etc. may be exemplified, when n is 1, bisphenol-A bis(diphenylphosphate), resorcinol bis(diphenylphosphate), resorcinol bis[bis(2,6-dimethylphenyl) phosphate], resorcinol bis [bis(2,4-ditertary butylphenyl) phosphate], hydroquinone bis[bis(2,6-dimethylphenyl) phosphate], hydroquinone bis[bis(2,4-diterybutylphenyl) phosphate], etc. may be exemplified, but is not limited thereto. In addition, the phosphoric acid ester-based compound may be applied alone or in a mixture of two or more.

The phosphorus-based flame retardant may be included in an amount of 5 to 25 parts by weight based on 100 parts by weight of the resin composition. For example, the phosphorus-based flame retardant may be included in an amount of 10 to 25 parts by weight, for example, 15 to 25 parts by weight based on 100 parts by weight of the resin composition. The phosphorus-based flame retardant in the above range may improve flame retardancy without deteriorating other physical properties of the resin composition.

The resin composition according to an embodiment may further include other additives of an antioxidant, a UV stabilizer, a fluorescent brightener, a release agent, a nucleating agent, a lubricant, an antistatic agent, a stabilizer, a reinforcing material, a coloring agent such as a pigment or a dye, etc. For example, the other additives may be included in an amount of 0.1 to 10 parts by weight based on 100 parts by weight of the resin composition, but are not limited thereto.

A molded article according to an embodiment is manufactured from the resin composition. For example, the resin composition may be melt-extruded in an extruder into a form of pellets, after mixing the components and other additives simultaneously. The pellets may be manufactured into various molded articles through various molding methods such as injection molding, extrusion molding, vacuum molding, and casting molding.

For example, the molded article may have improved impact resistance, heat stability, and flame retardancy and thus may be used to manufacture automobile parts or exterior materials that require these properties, as well as housings for electrical and electronic products such as television, washing machine, cassette player, MP3, DMB, navigation, mobile phone, telephone, game machine, audio players, monitors, computers, printers, and copiers.

MODE FOR INVENTION

Hereinafter, structures and functions of the disclosure are illustrated in more detail with reference to preferable examples. However, these examples, however, are not in any sense to be interpreted as limiting the scope of the disclosure.

EXAMPLES

Examples 1 to 6 and Comparative Examples 1 to 3

The components used in examples and comparative examples are as follows:

(A) Polycarbonate Resin

Polycarbonate resin having a flow index (300° C., 1.2 kg) of 19±2.0 g/10 min measured according to ISO 1133 (Manufacturer: Lotte Advanced Materials Co., Ltd.)

(B) Inorganic Filler
(B-1) Calcium carbonate
Bulk density: 0.3-0.6 (Manufacturer: OMYA)
(B-2) Talc
Bulk density: 0.4-0.6, Moisture: Max 0.35 (Manufacturer: HAICHENG XINDA MINING INDUSTRY)
(B-3) Wollastonite
Bulk density: 0.3-0.6, Moisture: Max 0.5 (Manufacturer: NYCO)
(C) Polyolefin-Based Resin Including Glycidyl Group
Ethylene-glycidyl methacrylate grafted styrene acrylonitrile (Manufacturer: NOF Corporation, Tradename: Modiper A4400)
(D) Phosphorus-Based Flame Retardant
Bisphenol-A bis(diphenyl phosphate) (BDP) (Manufacturer: Yoke)

The resin compositions of Examples 1 to 6 and Comparative Example 1 to 3 prepared by using the components respectively in the amounts and according to the compositions shown in Table 1 were melted, kneaded, and extruded to produce pellets. Herein, the extrusion was performed by using a twin-screw extruder having L/D (length/diameter) of 36 and a diameter of 45 mm and processed at 230° C. to 300° C. to produce the pellets. The manufactured pellets were dried at 80° C. for 4 hours or more and then, injected by an injection machine (a 150 ton single injection machine) at 250° C. to produce specimens.

TABLE 1

| | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| (A) PC resin (wt %) | | 80 | 80 | 80 | 80 | 72 | 78 | 80 | 80 | 80 |
| (B) Inorganic filler (wt %) | (B-1) calcium carbonate | 20 | — | — | 5 | 3 | 10 | 20 | — | — |
| | (B-2) talc | — | 20 | — | 15 | — | 5 | — | 20 | — |
| | (B-3) wollastonite | — | — | 20 | — | 25 | 7 | — | — | 20 |
| (C) EGMA-g-SAN (parts by weight) | | 2 | 2 | 2 | 1 | 2 | 2 | — | — | — |
| (D) BDP (parts by weight) | | 15 | 15 | 15 | 15 | 15 | 15 | 15 | 15 | 15 |

(Parts by weight: parts by weight based on 100 parts by weight of the resin composition containing (A) and (B))

Evaluation

The specimens according to Examples 1 to 6 and Comparative Examples 1 to 3 were evaluated with respect to retention thermal stability and notched Izod impact strength in the following methods, and the results are shown in Table 2.

Retention Thermal Stability

Each resin composition having the above compositions was processed by using a twin-screw extruder having L/D=36 and a diameter of 45 mm at a barrel temperature of 230° C. to 300° C. to produce pellets. The produced pellets were dried at 80° C. for 4 hours or more, placed in a screw of the injection machine (150 ton single injection machine) at 250° C. for 600 seconds, and then, evaluated with respect to retention thermal stability by measuring and classifying gas generation degrees on the surfaces.

Retention thermal stability: (Best) 1-2-3-4-5 (Worst)

Notched Izod Impact Strength

Notched Izod impact strength was measured in accordance with ASTM D256 standard for ⅛" specimens.

TABLE 2

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Retention thermal stability | 3 | 2 | 2 | 1 | 1 | 1 | 5 | 5 | 5 |
| Notched Izod impact strength (⅛", kgfcm/cm) | 4.5 | 4.7 | 4.4 | 5.3 | 5.5 | 5.2 | 3.1 | 3.3 | 2.8 |

As shown in Table 2, the resin compositions including the polyolefin-based resin including the glycidyl group along with the inorganic filler according to Examples 1 to 6 exhibited excellent thermal stability and impact resistance, while placed in the screw, compared with the resin compositions including the inorganic filler alone according to Comparative Example s1 to 3.

Simple modifications or alterations of the present disclosure may be embodied by a person skilled in the art in this art and such modifications or alterations are considered to be included in the scope of the present disclosure.

The invention claimed is:

1. A resin composition, comprising, based on a total weight of the composition,
   (A) 50 to 90 wt % of a polycarbonate resin;
   (B) 3 to 30 wt % of an inorganic filler;
   (C) 0.1 to 10 wt % of a polyolefin-based resin including a glycidyl group; and
   (D) 5 to 25 wt % of a phosphorus-based flame retardant, wherein the inorganic filler comprises a first inorganic filler that is calcium carbonate, and a second inorganic filler selected from talc, wollastonite, or a combination thereof, wherein the first inorganic filler and the second inorganic filler are included in a weight ratio of 1:1 to 1:9.

2. The resin composition of claim 1, wherein the polyolefin-based resin including a glycidyl group comprises a polyethylene backbone having an epoxy group.

3. The resin composition of claim 2, wherein the polyolefin-based resin including a glycidyl group is a copolymer of poly(ethylene-co-glycidyl methacrylate) and any one of a styrene-based polymer or an acrylonitrile-styrene copolymer.

4. The resin composition of claim 1, wherein the phosphorus-based flame retardant is bisphenol-A bis(diphenylphosphate).

5. A molded article manufactured using the resin composition of claim 1.

* * * * *